United States Patent Office 3,021,604
Patented Feb. 20, 1962

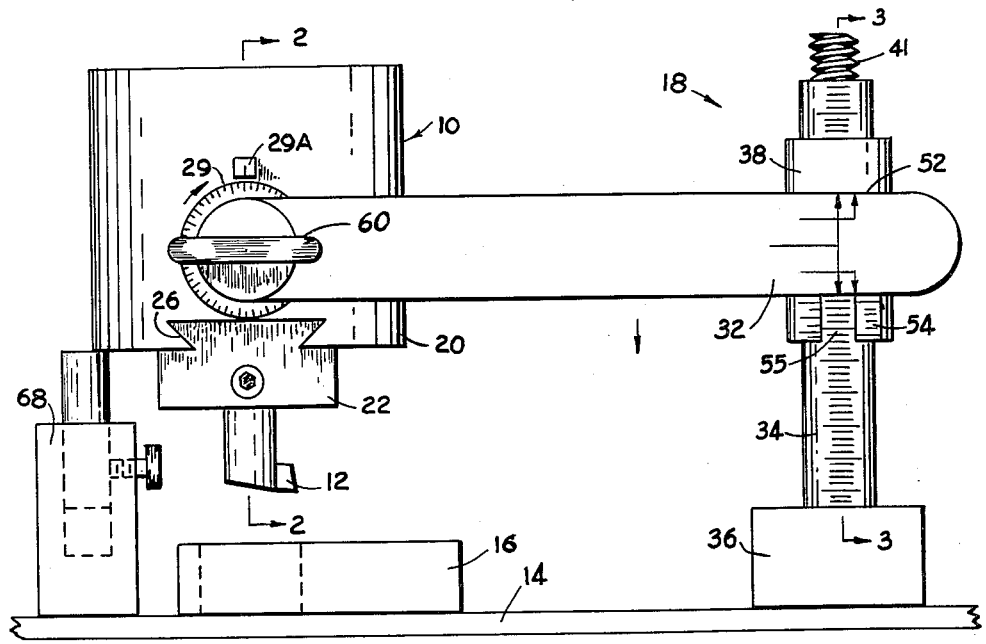
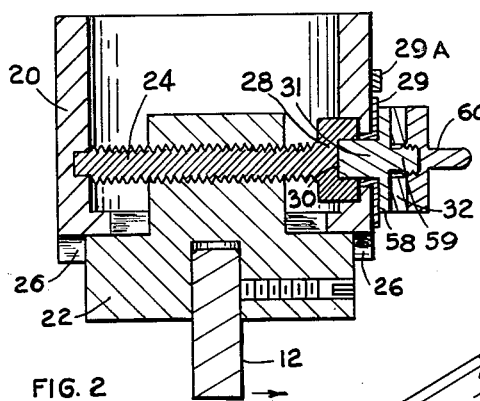
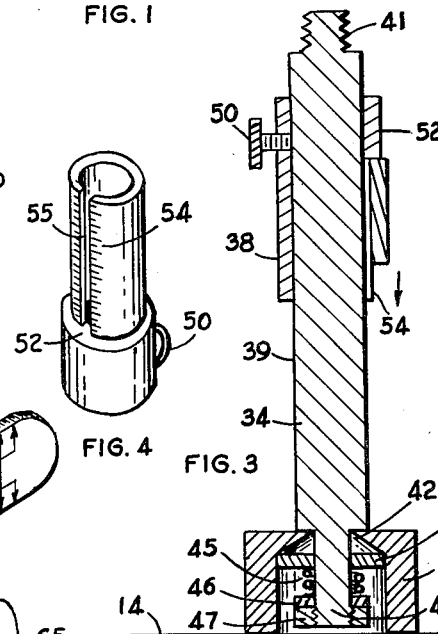
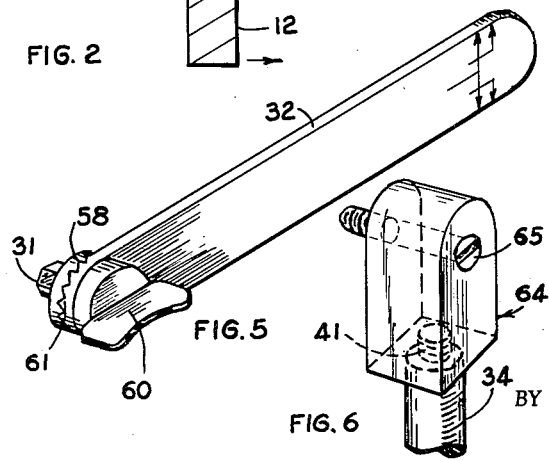

3,021,604
WAYS AND MEANS FOR ADJUSTING
WORK TOOLS
Allan N. Moore, 2053 Swensberg NE.,
Grand Rapids, Mich.
Filed Jan. 22, 1959, Ser. No. 788,388
7 Claims. (Cl. 33—185)

This invention relates to ways and means for adjusting work tools. More particularly, it relates to ways and means for adjusting with high precision and accuracy work tools which can be adjusted by rotation of a rotatable adjustment member thereof.

There are a number of work tools which, under use conditions, must be frequently and accurately adjusted. A typical example is a boring machine wherein the boring tool must be adjusted stepwise to different cutting diameters during each boring operation. Usually such machines are provided with a rotatable adjustment member for changing the cutting diameter of the boring tool when desired. In such operations, particularly in the manufacture of machine tools, the change in the cutting diameter of the boring tool must be accurately made. Consequently, it is necessary to provide ways and means for indicating, measuring and controlling within precise limits the change in the cutting diameter made by the adjustment.

Heretofore, one means for indicating and measuring the change has comprised a calibrated, circular, dial element, and a pointer or indicator element. Either the dial element or the indicator element is secured to the rotatable adjustment member of the machine and rotates therewith. The other element, either the indicator or the dial, is secured to the housing of the machine and adapted to be stationary relative to the first, rotatable, element. By noting the position of the dial element relative to the indicator element before rotating the machine adjustment member and then by rotating the machine adjustment member until another predetermined position has been reached, adjustment of the work tool may be accomplished.

Such an arrangement is not satisfactory, however, especially when precision work is involved. The reason is that the diameter of the dial element is necessarily limited by the size of the tool holder head. As a result, the sensitivity of the adjustment is low. Considerable care and substantial time are involved in reading the dial and in making precise and minute adjustments.

There has also been developed in the art, especially in conjunction with boring tools, a device which actually measures the distance from the boring tool cutting edge to a fixed point. This is disadvantageous because the cutting tool edge must always be in the same position when adjusting the tool and in making measurements. This development has another disadvantage in that it is readily damaged by dropping, for example, to the extent of losing its accuracy and sensitivity.

A general object of this invention is to provide a highly sensitive, accurate and precise work tool adjustment means for such machines.

A specific object of this invention is to provide a work tool adjustment means which inherently retains its accuracy, precision and high sensitivity regardless of whether or not it is dropped or struck.

Still another specific object of this invention is to provide a work tool adjustment means simple in structure and inherently rugged.

These and other objects which may appear as this specification proceeds are achieved by this invention, which shall be described with reference to the drawings which form a material part of this disclosure.

FIG. 1 is a front elevation of a preferred embodiment of the work tool adjustment instrument of this invention, which instrument is shown in conjunction with the pertinent portions of the head of a boring machine.

FIG. 2 is a sectional view of the lower part of the boring machine head, taken along the lines 2—2 of FIG. 1.

FIG. 3 is a sectional view taken along the lines 3—3 of FIG. 1.

FIG. 4 is a perspective view of the slidable scale of FIG. 1, this scale being shown in the upside down position to more clearly show the details thereof.

FIG. 5 is a perspective view of the radius arm of FIG. 1.

FIG. 6 is a perspective view of a modification of the mounting means for the scale guide of this invention.

In general, the drawings disclose a work tool adjustment instrument based on the principle that the linear distance traveled by a radius arm for a given arc of rotation increases with an increase in radius. Thus, as an example, for a 10° arc, the linear distance traveled by a radius arm at a radius of one inch is about 0.17 inch, while the linear distance traveled by a radius arm through said arc at a radius of six inches is about 1.02 inches. In accordance with this invention, the greater the radius of the indicator means from the center of radial adjustment, the more accurate and precise is the adjustment made therewith.

In general, the drawings disclose a work tool adjustment instrument comprising a radius arm having means for engagement with, and disengagement from, the rotatable adjustment member of the machine tool. The work tool adjustment instrument also comprises a normally vertically disposed scale guide and a calibrated scale slidably mounted on the scale guide. The scale has means for establishing and maintianing the same in a predetermined position on the scale guide and, preferably, shoulder means for limiting movement of said radius arm to one radial direction.

*Structure*

Specifically, FIG. 1 of the drawings discloses the lower portion of a boring machine head 10 which can be raised and lowered and which, under normal operative conditions, rotates about a vertical axis. The boring machine head 10 has mounted therein a boring tool 12. Below the boring machine head 10 there is provided a workbed 14 on which is mounted work 16 to be bored. At this point, it should be mentioned that the type of machine is not critical to this invention and that the boring machine here illustrated is set forth for exemplary purposes only and not for purposes of limitation. All that is important is that the machine have a rotatable adjustment member. The boring machine head 10 comprises a housing 20 within which is mounted a downwardly extending tool holder 22. At the bottom end of the tool holder 22 is mounted a boring tool 12. The upper end of the tool holder 22 is threadedly mounted on a horizontally disposed jackscrew 24. Laterally the tool holder 22 is mounted on a dovetail slide or track 26 at the bottom end of the housing 20. Both ends of the jackscrew 24 are rotatably secured to the housing 20. One end, however, has a socket member 28. Secured to the socket member 28 is a calibrated dial 29. It will be observed that the dial 29 is disposed outside of, but adjacent to, the front of the housing 20 and that the housing 20 is provided with a stationary indicator 29A at the circumference of the dial 29.

The socket member 28 comprises a socket 30 for receiving an adjustment key 31. As shown in FIG. 5, the adjustment key 31 is in the form of an Allen head.

Up to this point the structure described is conventional. To adjust the cutting diameter of the boring tool 12, the key 31 is inserted into the socket 30 and rotated, clockwise rotation in the embodiment shown producing an increase in the cutting diameter of the boring tool 12. Without the application of the concepts of this invention, the extent of the adjustment will normally be judged by the calibrations on the dial member 29 moving past and indicated by the indicator 29A. However, the accuracy of the adjustment is limited by the precision with which the dial can be read and interpolated. As can be seen, this precision would be quite low.

With the adjustment instrument 18 of this invention, however, the precision of such an adjustment can be made quite high. This instrument 18, as shown in FIG. 1, comprises a radius arm 32 fastened to the Allen head key 31, a scale guide 34 and a calibrated scale 38.

The scale guide 34 comprises a standard 39, circular in cross section. At the lower end of said standard 39 there is provided a threaded stem member 40 (FIG. 3). At the upper end thereof there is provided a threaded stem member 41.

As shown in FIGS. 1 and 3, the bottom stem member 40 is rockably secured to a base 36. In the embodiment shown in FIG. 3, the base 36 comprises a block, which is preferably composed of a magnetic material. The block has a circular aperture 42 on top thereof of diameter greater than the diameter of the stem 40 but less than the diameter of the main portion of the standard 39. The aperture 42 opens into an open bottom, inner chamber in the block. When mounted, the standard 39 rests on top of the block with the bottom stem 40 extending through the aperture 42 into the inner chamber. Inside the chamber the stem 40 is laterally encircled by an upper washer 44 which is seated in the upper portion of the inner chamber. Bearing against the upper washer 44 and encircling the stem 40 is a coiled compression spring 45. Below the compression spring 45 there is provided a lower retaining washer 46 of lesser outside diameter than the diameter of the chamber. Below the washer 46 there is threadedly secured to the stem 40 a retaining nut 47.

With the base 36 resting on the workbed 14, the standard 39 is in a normally vertical position. However, with the fastening structure here provided, the standard 39 can be bent over slightly in either direction when desired or necessary to facilitate use of the radius arm 32 when making an adjustment of the boring tool 12 cutting diameter.

Instead of mounting the standard 39 on a base 36 at the bottom thereof, the standard may be mounted on an overhead fixture 64 such as that shown, for example, in FIG. 6. In such case, the base 36 is not necessary and can be removed if desired. The overhead fixture 64 is provided with a bottom threaded opening for threadedly engaging the upper threaded stem member 41 of the standard 39. The fixture 64 is provided with a fastener 65 for attaching the same to the overhead framework of the machine with which the adjustment instrument 18 is to be used. In the embodiment shown in FIG. 6, the fixture 64 can be swung on the fastener 65 either towards or away from the machine head 10 when necessary or desirable to facilitate use of the radius arm 32 when adjusting.

The scale 38 (FIG. 4) comprises a hollow cylinder of size and shape for insertion on, and for sliding up and down, the standard 39 of the scale guide 34. The back side of the slidable scale 38 is provided with a locking screw 50 whereby the slidable scale 38 can be moved to any given position on the scale guide 34 and locked into place. On the front side of the slidable scale 38 there is provided at one end thereof a shoulder portion 52 against which the radius arm 32 may be seated. Between the shoulder member 52 and the other end of the slidable scale member 38 there is provided a facing 54 interrupted at the center thereof by a longitudinal slot 55. On each side of the slot 55 there are provided indicia lines of desired unit measurement (FIG. 4). Thus, on the left hand side of the slot 55 there may be provided the indicia lines for a 0.0002 inch scale. On the right hand side of the slot 55 the indicia lines on the facing 54 may be those of a 0.0005 inch scale. The slot 55 functions to reveal the indicia lines which advantageously may be provided on the standard 39 of the scale guide 34. As an example, the indicia lines on the standard 39 may be those of a 0.0001 inch scale.

The radius arm 32 may be directly connected to the Allen head key 31. This has a disadvantage, however, in that the turning arc of the radius arm 32 may be limited if the scale guide 34 is in the end region of the radius arm. In such case, if the permissible turning arc is exceeded by the radius arm 32 during adjustment operations, the arm 32 with the key 31 must be removed from the socket member 30 and reinserted with the radius arm back within the limits of the turning arc.

Consequently, the radius arm 32 in FIGS. 1, 2 and 3 is provided with means for avoiding this disadvantage. Thus, the Allen head key 31 is made integral with a plate member 58 having an outwardly extending central shaft 59 threaded at the outer end thereof. The radius arm 32 is mounted on the shaft 59 and a wing nut 60 is threadedly engaged with the outer end of the shaft 59. The plate 58 and the radius arm 32 are provided with adjacent, mated, serrated surfaces. With the wing nut 60 tightened down, rotation of the radius arm 32 will rotate the plate 58 and the Allen key member 31. However, by loosening the wing nut 60, adjacent serrated surfaces can move relative to one another and the radius arm 32 may be returned to a desired position within the permissible turning arc without causing the plate and Allen head key member 31 to rotate.

Operation

To use the adjustment instrument 18, the boring machine head 10 is elevated to a reference position. This position may be established by elevating the head to the maximum limit of the machine. Where this is not practical, the head 10 may be lowered to a reference position established by means of a stop block 68 which can be moved into and out of position beneath the head 10. The key 31 of the radius arm 32 is inserted into the socket 30 with the radius arm 32 in a substantially horizontal position. The slidable scale 38 is adjusted until the shoulder portion 52 thereof is seated against one side, in FIG. 1 shown as the top side, of the end of the radius arm 32. After tightening the set screw 50, the radius arm 32 is then moved downwardly until one of the arrows on the outside face of the radius arm 32 has passed on one or more of the scales the number of indicia lines representative of the desired increase in cutting diameter of the tool 12. The radius arm 32 is then removed from the boring machine head 10 and the stop block 68 is shoved out of position. The boring machine is then turned on and the boring tool 12 lowered into the work 16 until the hole therein has been bored out.

The head 10 is then raised, the machine turned off, the stop block 68 moved into position and the head 10 brought to rest on the top of the stop block 68. The radius arm 32 is then placed into its last described position relative to the scale 38 and with the key member 31 thereof inserted into the socket 30. The procedure is then repeated until the desired diameter of hole in the work 16 is reached.

To reset the boring tool 12 to the original cutting diameter preparatory to boring a similar hole in another portion of the work 16, the head 10 is raised to the reference position, the stop block 68 is shoved into place, and the radius arm key 31 is inserted into the socket 30 with the other end of the radius arm displaced downwardly from the shoulder portion 52 by the total number of units of cutting diameter increment represented by the indicia lines on pertinent scale of the facing 54 or standard 39. The radius arm 32 is then raised to seat against the shoulder portion 52, thereby bringing the cutting tool 12 back to its initial cutting diameter.

From the foregoing description, it will be seen that all that need be known for calibrating the scale indicia on the face 54 of the scale 38 and the standard 39 of the scale guide 34 is (1) the arc of rotation necessary to increase the cutting diameter of the tool 12 by a given unit of measurement and (2) the horizontal distance from the center of rotation to the scale guide 34 or, stated another way, the length of the radius arm from the center of rotation to the point of indication thereon (which point is where the scale guide 34 should be positioned). With these facts known, these facts being within the ordinary skill of the art and dependent on local conditions, the spacing of the indicia lines on a scale of the face 54 and standard 39 for a given unit of measurement of the change in cutting diameter can be readily calculated when a direct reading scale is desired. With these facts known, the number of indicia lines on a scale of the face 54 and standard 39 for a given unit of measurement of the change in cutting diameter can be determined when an indirect reading scale is desired. In either case, to calibrate a direct reading scale or to determine the change in diameter from an indirect reading scale, the following mathematical formula may be used, to wit:

$$s = \frac{\pi r k d}{180}$$

wherein $s$ is the length of arc for calibrating the scale or distance between indicia on an indirect reading scale, $r$ is the horizontal distance from the center of rotation to the scale guide 34, $d$ is the change in cutting diameter, and $k$ is the degree of arc of rotation necessary for increasing the cutting diameter of the tool 12 by a given unit of measurement.

The adjustment instrument 18 of this invention has an advantage in that it is highly sensitive and accurate within an arc of about 15° on either side of the horizontal position thereof.

It has another advantage in that the linear distance through which the indicator end of the radius arm moves is directly proportional to the angle of rotation of the Allen head key 31 and thus of the increase in cutting diameter of the boring tool 12.

Another advantage of the adjustment tool of this invention is that the length of the radius arm can be increased for increased accuracy. Still another big advantage of this invention is that interpolation setting (measuring between indicia lines) can be minimized.

An important advantage of this invention is that it can be readily applied to existing low accuracy boring heads and high precision obtained.

Another advantage of this invention is that the radius arm 32 provides leverage for making adjustments. Hence, machines with tight fitting adjustment means can be more easily as well as precisely adjusted by using the instrument of this invention.

Still another advantage of this invention resides in the feature of rapid adjustment and assembly of the adjustment instrument components with a minimum of down time on the machine for adjustment. Other advantages and features of this invention will be apparent to those in the exercise of ordinary skill in the art upon reading the foregoing description.

This invention may be embodied in several forms without departing from the spirit or essential characteristics thereof. Thus, the adjustment instrument concepts of this invention may be applied to horizontally disposed machines having rotatable adjustment members which result in the radius arm 32 being movable in a horizontally disposed plane. In such event, the scale guide 34 will be disposed in a similar plane. The embodiments just described are, therefore, illustrative and not restrictive, since the scope of the invention is defined by the appended claims rather than by the description preceding them, and all changes that fall within the metes and bounds of the claims, or that form their functional as well as conjointly cooperative equivalents, are therefore intended to be embraced by those claims.

I claim:

1. A work tool adjustment instrument for work tools adjustable by the manual rotation of a rotatable adjustment member, which comprises: radius arm means; engagement means on said radius arm means for engagement with, and disengagement from, said rotatable member and being readily attachable thereto and detachable therefrom; scale guide means disposed transversely and adjacently to said radius arm means and positioned at a point removed from said engagement means; and scale means movably mountable on said scale guide means, said scale means comprising unit length indicia, means for establishing and maintaining said scale means in a predetermined position on said scale guide means and said scale means including shoulder means for limiting movement to one direction of said radius arm means, said radius arm being otherwise freely movable with respect to said scale means.

2. A work tool adjustment instrument for work tools adjustable by the manual rotation of a rotatable member, which comprises: radius arm means; engagement means on said radius arm means for engagement with, and disengagement from, said rotatable member along the axis of rotation thereof; scale guide means including mounting means therefor disposed transversely and adjacent to said radius arm means and positioned at a point removed from said engagement means; and scale means slidably mounted on said scale guide means, said scale means comprising unit length indicia, means for establishing and maintaining said scale means in a predetermined position on said scale guide means and said scale means including shoulder means for limiting movement to one direction of said radius arm.

3. A work tool adjustment instrument according to claim 2 wherein said means for mounting said scale guide means comprises an overhead, swingable, fixture.

4. A work tool adjustment instrument according to claim 2 wherein said scale guide means has unit length indicia of a different length than said scale means unit length indicia.

5. A work tool adjustment instrument according to claim 2 wherein the rotation of the radius arm means one indicia length on said scale means represents a change of cutting diameter equal to $$\frac{\pi r k d}{180}$$

6. A work tool adjustment instrument according to claim 2 wherein said means for mounting said scale guide means comprises a base with means for fastening said scale guide means thereto.

7. A work tool adjustment instrument according to claim 6 wherein said scale guide means is laterally movable on said base.

References Cited in the file of this patent

UNITED STATES PATENTS

| | | |
|---|---|---|
| 925,674 | Austin | June 22, 1909 |
| 1,169,762 | Belcher | Feb. 1, 1916 |
| 1,236,748 | Osberg et al. | Aug. 14, 1917 |
| 1,278,570 | Beck | Sept. 10, 1918 |
| 1,336,311 | Martin | Apr. 6, 1920 |
| 1,384,221 | Wall et al. | July 12, 1921 |
| 1,900,231 | Ede | Mar. 7, 1933 |
| 2,107,558 | Zimmerman | Feb. 8, 1938 |
| 2,341,466 | Nardi | Feb. 8, 1944 |